E. MAKER.
PUNCH.
APPLICATION FILED JUNE 13, 1916.
1,222,961.
Patented Apr. 17, 1917.
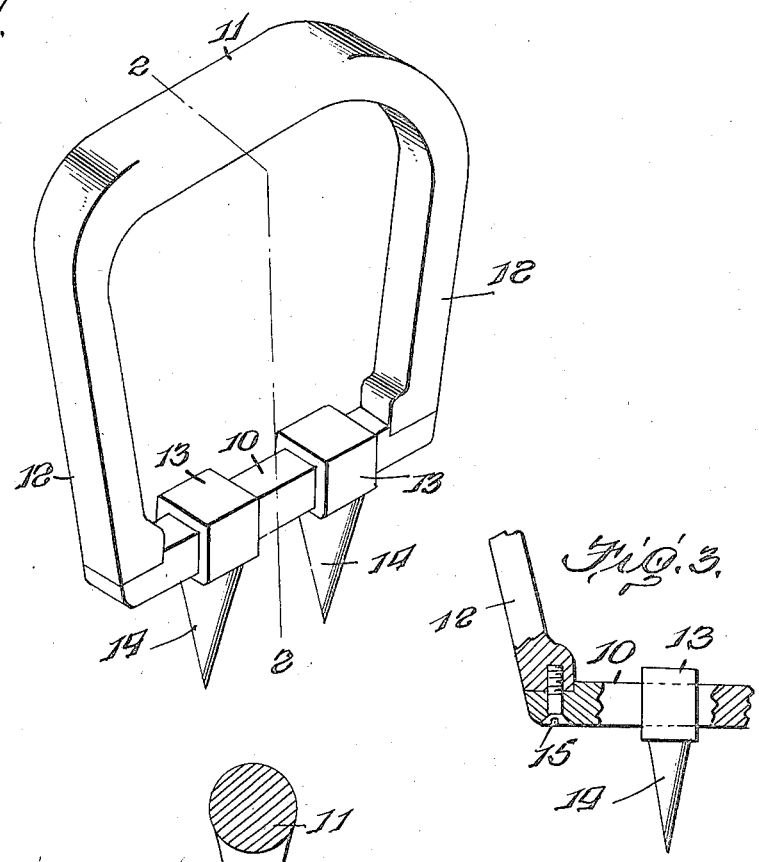
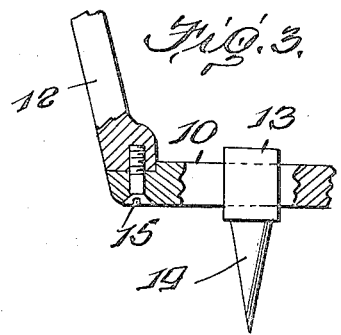
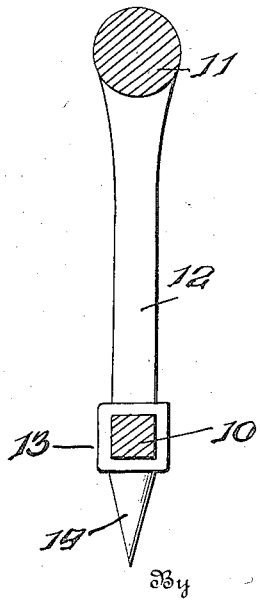
Inventor
Ernest Maker.

UNITED STATES PATENT OFFICE.

ERNEST MAKER, OF ELSINORE, CALIFORNIA.

PUNCH.

1,222,961.　　　　Specification of Letters Patent.　　Patented Apr. 17, 1917.

Application filed June 13, 1916. Serial No. 103,488.

*To all whom it may concern:*

Be it known that I, ERNEST MAKER, a citizen of the United States, residing at Elsinore, in the county of Riverside and State of California, have invented certain new and useful Improvements in Punches, of which the following is a specification.

This invention relates to improvements in devices for simultaneously producing a discharge aperture and vent aperture in cans or like receptacles containing liquids, to enable the contents of the cans to be discharged through one of the orifices or apertures and to admit air through the other aperture to obviate the formation of a vacuum within the receptacle which would otherwise prevent the free discharge of the contents.

In the drawings illustrative of the preferred embodiment of the invention;

Figure 1 is a perspective view of the improved implement;

Fig. 2 is a section on the line 2—2 of Fig. 1;

Fig. 3 is a sectional detail illustrating the manner of uniting the main frame to the bridge member.

Corresponding and like parts are referred to in the following description and indicated in all the views of the drawings by the same reference characters.

The improved implement includes a supporting frame, preferably of the form shown in Fig. 2, and having a lower transverse base portion 10, and an upper or hand grip portion 11 and connecting side portions 12. Slidably disposed upon the lower portion 10 of the frame are sleeves or collars 13, each sleeve having a depending stud 14, preferably pointed, as shown. By this means the points or studs 14 may be adjusted toward or away from each other to control the distance between their terminals. The base portion 10 is preferably connected to the side portions 12 as by screws, one of which is shown at 15 in Fig. 3, so that the sleeves 13 may be readily removed for sharpening the points, or renewing the sleeves and points when broken or impaired.

The improved implement is designed more particularly for puncturing cans containing liquids or semi-liquids, such as condensed milk cans and the like, and is operated by disposing one of the points 14 in position upon the cans where it is desired to form a discharge opening or orifice, and disposing the other point 14 at a point as remote as possible from the other point to provide for the formation of another aperture in the can to serve as a vent, or to permit the entrance of air to facilitate the discharge of the contents of the can. By forming the portion 10 of considerable length the improved implement may be readily adapted to cans of varying sizes. In operating the improved device one of the studs should be located adjacent to one of the side walls of the can, while the other stud should be located as near as possible to the opposite wall of the can, one of the orifices being employed, as above stated, as a discharge opening for the contents of the can, while the other stud produces the requisite vent aperture or orifice.

The improved implement may likewise be employed for forming any required number of the apertures, as will be obvious.

The improved implement is simple in construction, can be inexpensively manufactured and of any suitable material and of any suitable strength.

Having thus described the invention, what is claimed as new is:

An implement of the class described comprising a holder including an upwardly arching portion having spaced sides connected at their upper ends by a hand grip portion and connected at their lower ends by a base portion, sleeves independently slidable on said base portion, and a puncturing device depending from each sleeve.

In testimony whereof I affix my signature.

ERNEST MAKER. [L. S.]